US012725233B2

(12) United States Patent
Ramakrishnan et al.

(10) Patent No.: US 12,725,233 B2
(45) Date of Patent: Sep. 1, 2026

(54) AUTOMATIC DETERMINATION OF THE PRESENCE OF BURN-IN OVERLAY IN VIDEO IMAGERY

(71) Applicant: BAE Systems Information and Electronic Systems Integration Inc., Nashua, NH (US)

(72) Inventors: Sowmya Ramakrishnan, Kendall Park, NJ (US); Wesley Chen, Chapel Hill, NC (US); Francis G. Shorter, Cary, NC (US); Robert T. Jobe, Durham, NC (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 281 days.

(21) Appl. No.: 18/537,994

(22) Filed: Dec. 13, 2023

(65) Prior Publication Data

US 2025/0200730 A1 Jun. 19, 2025

(51) Int. Cl.
*G06T 5/77* (2024.01)
*G06T 7/00* (2017.01)
(Continued)

(52) U.S. Cl.
CPC .............. *G06T 5/77* (2024.01); *G06T 7/0002* (2013.01); *G06T 7/13* (2017.01); *G06T 7/136* (2017.01);
(Continued)

(58) Field of Classification Search
CPC ........... G06T 5/77; G06T 7/0002; G06T 7/13; G06T 7/136; G06T 2207/10016;
(Continued)

(56) References Cited

U.S. PATENT DOCUMENTS 8,873,840 B2 * 10/2014 Krupka ................ G06V 10/809 382/159
10,963,676 B2 * 3/2021 Wang .................. G06V 10/764
(Continued)

FOREIGN PATENT DOCUMENTS

WO 2022/177722 A2 8/2022

OTHER PUBLICATIONS

Chen, Datong, Jean-Marc Odobez, and Jean-Philippe Thiran. "A localization/verification scheme for finding text in images and video frames based on contrast independent features and machine learning methods." Signal Processing: Image Communication 19.3 (2004): 205-217. (Year: 2004).*

(Continued)

*Primary Examiner* — Gregory A Morse
*Assistant Examiner* — Ronde Lee Miller
(74) *Attorney, Agent, or Firm* — Gary McFaline

(57) ABSTRACT

Systems, methods and computer systems for the automatic determination of presence or absence of burn-in overlay data are provided. The systems, methods, and computer systems implement mask generation, edge detection, feature vector generation methods that are combined with machine learning classifiers to rapidly and automatically determine the presence or absence of burn-in overlays in the image for the purpose of removal or other forms to obfuscate burn-in overlay data so as to maintain confidential or classified information while allowing for the release of remaining image data.

20 Claims, 4 Drawing Sheets

(51) Int. Cl.

| | |
|---|---|
| ***G06T 7/13*** | (2017.01) |
| ***G06T 7/136*** | (2017.01) |
| ***G06V 10/44*** | (2022.01) |
| ***G06V 10/764*** | (2022.01) |
| ***G06V 10/77*** | (2022.01) |

(52) U.S. Cl.
CPC ........ *G06V 10/446* (2022.01); *G06V 10/7715* (2022.01); *G06T 2207/10016* (2013.01); *G06T 2207/20081* (2013.01); *G06T 2207/30168* (2013.01); *G06V 10/764* (2022.01)

(58) Field of Classification Search
CPC ........... G06T 2207/20081; G06T 2207/30168; G06V 10/446; G06V 10/7715; G06V 10/764
See application file for complete search history.

(56) References Cited

U.S. PATENT DOCUMENTS

| | | | | |
|---|---|---|---|---|
| 11,386,683 | B1 * | 7/2022 | Ossim | G06V 30/19173 |
| 11,640,721 | B2 * | 5/2023 | Ma | G06T 7/90<br>382/162 |
| 11,776,104 | B2 * | 10/2023 | Strong | G06N 20/00<br>382/224 |
| 11,983,806 | B1 * | 5/2024 | Ramesh | G06T 5/60 |
| 2011/0075920 | A1 * | 3/2011 | Wu | G06V 10/457<br>382/160 |
| 2019/0047895 | A1 * | 2/2019 | Kuhn | G06T 7/0004 |
| 2019/0180464 | A1 * | 6/2019 | Kraft | G01F 22/00 |
| 2020/0065955 | A1 * | 2/2020 | Garlapati | G06V 20/00 |
| 2020/0134855 | A1 * | 4/2020 | Zucker | G06T 7/0004 |
| 2020/0151489 | A1 * | 5/2020 | Sriram | G06N 3/0442 |
| 2020/0294234 | A1 * | 9/2020 | Rance | G06F 18/22 |
| 2020/0349381 | A1 * | 11/2020 | Wang | G06V 30/19173 |
| 2020/0364501 | A1 * | 11/2020 | Herz | G07G 1/0054 |
| 2022/0122347 | A1 * | 4/2022 | Bhatt | G06V 10/95 |
| 2022/0245773 | A1 * | 8/2022 | Ramakrishnan | G06T 5/77 |
| 2022/0414402 | A1 * | 12/2022 | Sawkey | G06F 18/217 |
| 2024/0371002 | A1 * | 11/2024 | Price | G06V 10/82 |

OTHER PUBLICATIONS

Lee, Chang Woo, Keechul Jung, and Hang Joon Kim. "Automatic text detection and removal in video sequences." Pattern Recognition Letters 24.15 (2003): 2607-2623. (Year: 2003).*

Chen et al. "A localization/verification scheme for finding text in images and video frames based on contrast independent features and machine learning methods." In: IDIAP Research Report, May 2003, [online] [retrieved on Jan. 16, 2025] Retrieved from the Internet [URL: https://publications.idiap.ch/attachments/reports/2003/rr03-42.pdf].

International Search Report, PCT/US24/59149, mailed Jan. 27, 2025, 11 pages.

David A. Clunie , Dan Gebow; "Block selective redaction for minimizing loss during de-identification of burned in text in irreversibly compressed JPEG medical images", Journal of Medical Imaging 2(1), 016501 (Jan.-Mar. 2015), Downloaded From: https://www.spiedigitallibrary.org/journals/Journal-of-Medical-Imaging on Apr. 6, 2022.

Dr. Riad I. Hammoud; "Unconstrained Overlay Recognition Algorithm (Uncover) AFRL Minerva program", Dec. 8, 2016.

Mark A. Robertson, Todd B. Howlett; "Mosaics from video with burned-in metadata," Proc. SPIE 5787, Airborne Intelligence, Surveillance, Reconnaissance (ISR) Systems and Applications II, (May 10, 2005); doi: 10.1117/12.601777. Downloaded From: https://www.spiedigitallibrary.org/conference-proceedings-of-spie on Dec. 17, 2021.

Paul Viola, Michael Jones; "Rapid Object Detection using a Boosted Cascade of Simple Features". Accepted Conference on Computer Vision and Pattern Recognition 2001.

* cited by examiner

AUTOMATIC DETERMINATION OF THE PRESENCE OF BURN-IN OVERLAY IN VIDEO IMAGERY

FIELD

The disclosure relates to technology for the automatic identification of the presence of burn-in overlay in imagery. More particularly, the disclosure relates to systems and methods for the automatic identification of burn-in overlays in video imagery for the purpose of redaction of burn-in overlays from the image.

BACKGROUND

Images and, particularly, video imagery may include information overlayed on to the imagery. Such information is generally referred to as burn-in overlays and will hereinafter be referred to as "overlays." In some applications, this overlay information may include data regarding the sensors used for obtaining the imagery, performance of sensors, and the range of the sensor used to obtain the image. In other applications, the overlays may relate to sensitive medical data such as patient names and other personally identifiable information. As is generally well-understood, video consists of multiple still-images presented at a given rate to create the illusion of motion. Overlays may appear constant in videos while simultaneously being present in still-images utilized in the video. In some videos, overlays may be present in some still-images and absent in other still-images forming the video. Overlays may further be consistently placed (for example, in a corner of an image or around the center area of an image) or shifted throughout the images to allow image contents to be seen clearly (for example, on targeting system displays for military aircraft).

Because overlays may be present in some still-images and absent in other still-images forming the video, any redaction scheme that is constantly applied for obfuscating burn-in overlays on every single image of the video is going to adversely affect video exploitation performance. This adverse impact on video exploitation may occur, for example, when the redaction system encounters images without burn-in overlays in the video. In this situation, the video exploitation system will try to redact some parts of the image; thereby mis-reading the image areas as the burn-in overlays. To prevent this a system is needed to intelligently determine the presence and absence of burn-in overlays in an automated manner.

Regardless of the application, overlays may contain sensitive information that needs to be removed or obfuscated prior to releasing the video to another entity. This removal/obfuscation is time-prohibitive and resource intensive as the removal must be performed on every still-image used for a given video. Due to the frame rates required for video imagery and the processing resources for identifying and removing the overlays, the removal/obfuscation process is generally performed prior to releasing video. Thus, the time required to identify overlays and overlay removal prevents the release of video data in real-time and adds further costs to the release of video imagery.

Accordingly, there is a need for improved video processing that allows for rapid analysis of video imagery for the purposes of identifying and removing/preventing overlays.

SUMMARY

Disclosed herein are systems, methods, and computer-readable media for rapidly and automatically determining the presence of overlays for removing burn-in overlays in video imagery. In an example, a system comprising a processor coupled to memory having instructions for removing burn-in overlay is presented. The instructions available to the processor include receiving an image sequence (e.g., from a video) and applying a mask to each image in the image sequence. Thereafter, an edge detection module detects edges within the image to effectuate feature vector generation and classification using a machine learning algorithm.

BRIEF DESCRIPTION OF THE DRAWINGS

The various advantages of the examples of the present disclosure will become apparent to one skilled in the art by reading the following specification, claims, and by referencing the following drawings in which:

DESCRIPTION

Disclosed herein are systems, methods, and computer-readable media to perform the automatic detection and removal/suppression/obfuscation of burn-in overlay ("overlays") in video imagery. As disclosed herein, the system comprises a processor coupled to memory. The memory include instructions which, when executed by the processor, causes the system to rapidly analyze video imagery to identify feature vectors indicative of the presence of overlays. The system may further initiate a redaction process if a given feature vector is determined to be indicative of overlays.

Figure 1:
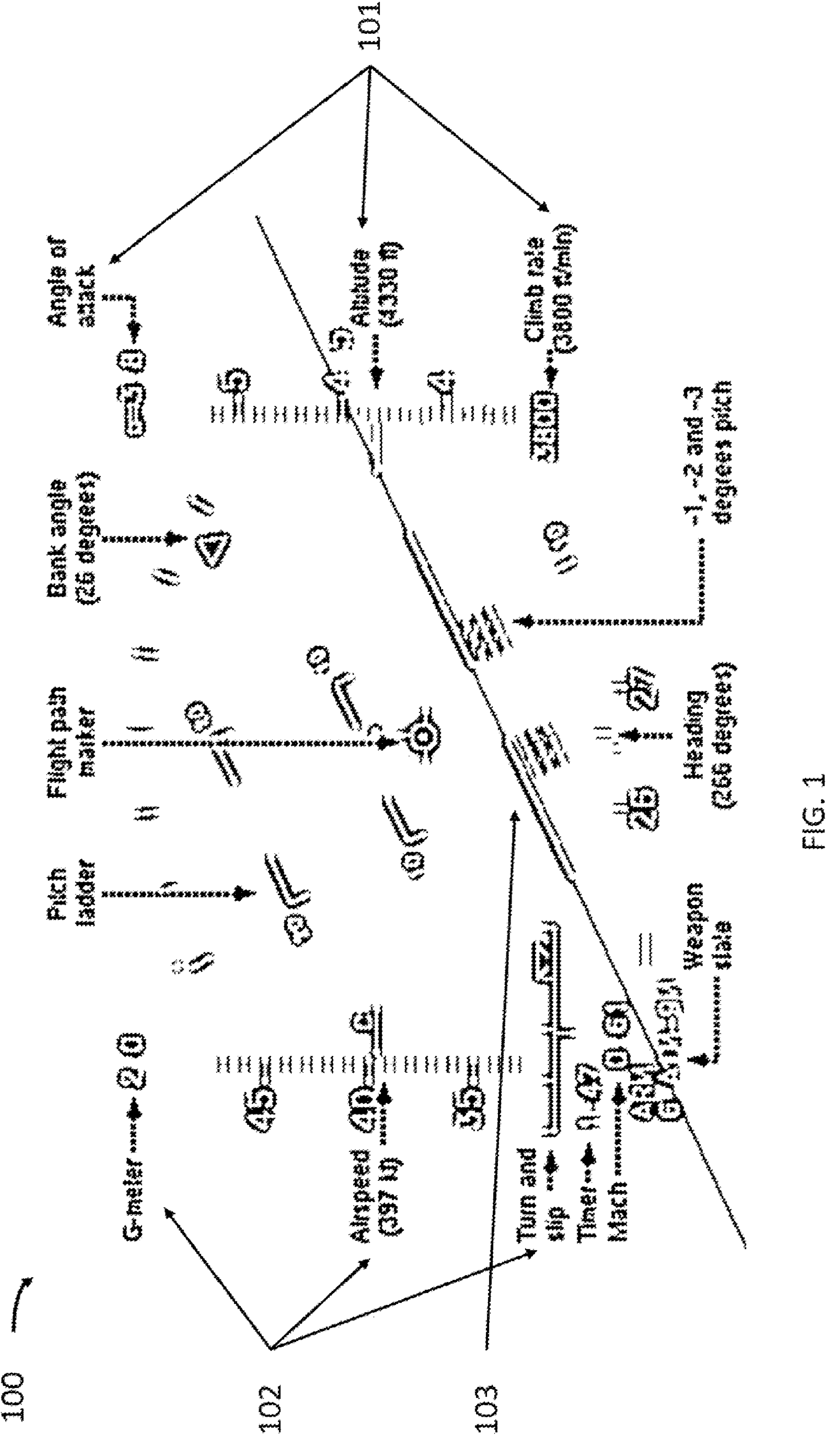
FIG. 1 provides an example image having burn-in overlay data.

FIG. 1 provides an example of an image having overlays. Image 100 may be one image or frame of a plurality of images or frames forming a video. Image 100 may include details 103 that are intended to be released to the public or other entity. Image 100 may further include overlays 101 and 102 that are to be removed, redacted, obfuscated, or otherwise suppressed. Skilled practitioners will recognize that overlays 101 and 102 may be located anywhere in a given image and may further shift or move from one image frame to another depending on image contents, imager settings, or other sensor settings. Skilled practitioners will further recognize that a video is comprised of multiple individual image frames presented to a viewer in rapid succession to create the illusion of movement and will further recognize that any one image or frame in a video may include or omit overlays 102 and 103 without a viewer recognizing the inclusion or omission.

Figure 2:
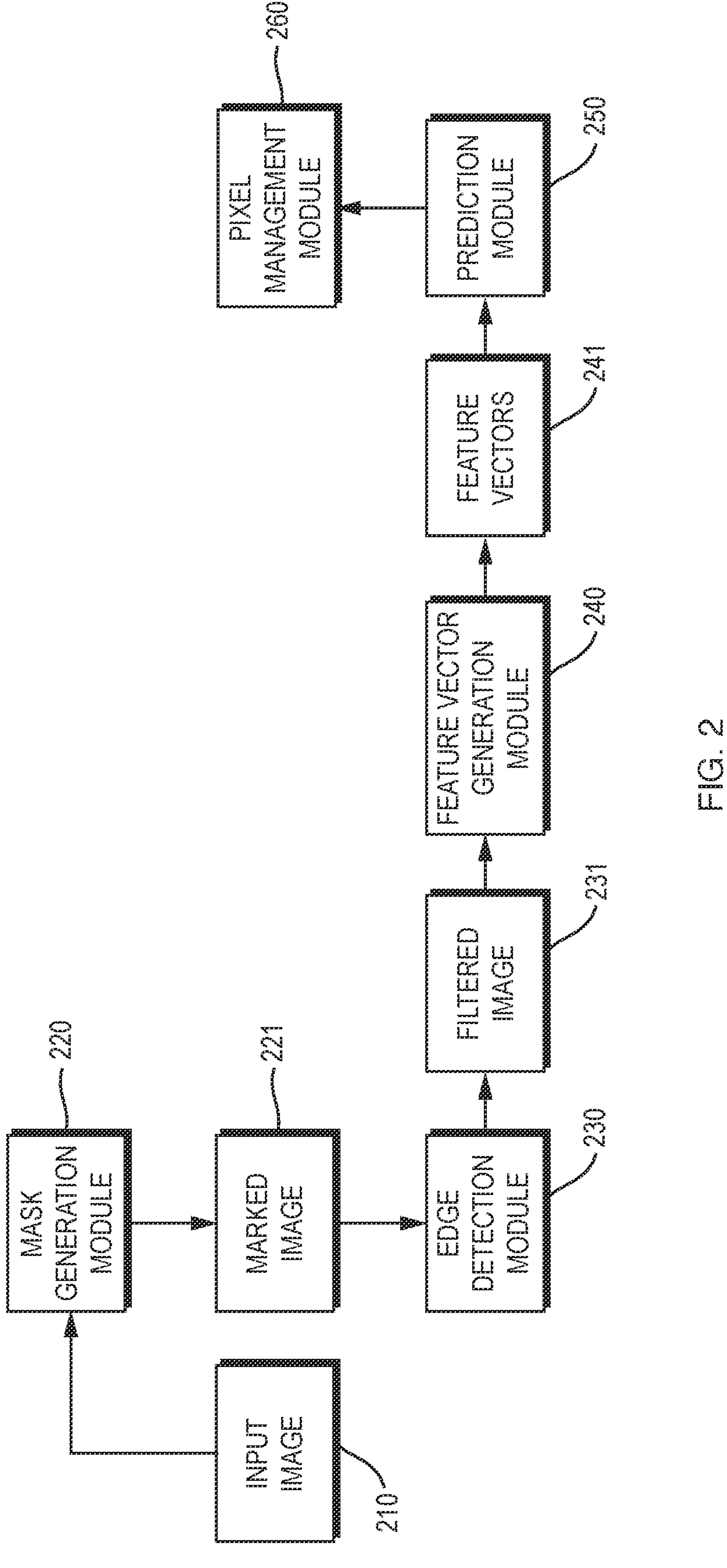
FIG. 2 provides a system for automatically removing burn-in overlay data.

FIG. 2 provides an overview of example system 200 for automatically detecting and managing overlays in video images, with reference to components and features described herein including, but not limited to, the figures and associated descriptions. The system 200 receives an input image 210. In some examples, a plurality of input images can be provided from an image sequence (e.g., from a video) or otherwise received by the system 200. Input image 210 is provided as input to the components of system 200, which includes a mask generation module 220, edge detection module 230, feature vector generation module 240, and classification module 250. The mask generation module 220 is configured to receive input image 210 and apply a mask to input image 210 to create masked image 221. Mask generation module 220 may utilize any image processing mask algorithms to generate masked image 221. Edge detection module 230 receives masked image 221 and applies edge detection filter to masked image 221 and calculates the pixel intensity of a plurality of pixels in masked image 221. The pixel intensities are then used by feature vector generation module 240 to create feature vectors 241 for the plurality of pixels in masked image 221. Feature vectors 241 are then received by classification module 250. Classification module 250 utilizes machine learning algorithms to predict whether feature vector 241 is indicative of the presence of an overlay. When an overlay is predicted by classification module 250, a pixel management module 260 is initiated. Pixel management module 260 receives a prediction from the classification module 250. When classification module 250 predicts the presence of an overlay, pixel management module 260 may remove, redact, distort, obfuscate, or otherwise make unreadable, by human or machine, the pixels associated with the predicted overlay.

Mask generation module 220 receives input image 210 and applies a mask algorithm to generate a masked image 221. The algorithm applied by the mask generation module 220 may be any mask generation algorithm as is known in the art. These algorithms may include, but are not limited to, mask generated based on color filtering, image decomposition filtering, thresholding, edge detection, clustering, graph-based masks, and mask generated using machine learning algorithms. Regardless of the technique used to generate the mask, mask generation module 220 isolates, extracts, and/or modifies parts of input image 210 to generate masked image 221.

Edge detection module 230 receives masked image 221 and applies edge detection filter/algorithm to identify the edges and/or boundaries within masked image 221 and calculate pixel intensities for a plurality of pixels comprising the masked image 221. Edge detection module 230 may apply any known edge detection algorithms including, but not limited to, Canny edge detection algorithm, Sobel operator edge detection, Prewitt operator edge detection, and Roberts operator edge detection. Regardless of the algorithm applied, edge detection module 230 is configured to filter the pixels comprising masked image 221 based on whether the intensity of said pixels meet or exceed some predetermined threshold and generate filtered image 231. In some embodiments, the edge detection filter is a Haar filter (also known as Haar wavelet filter in Signal Processing scientific literature). When applying a Haar filter, edge detection module 230 may apply the Haar filter such that the Haar filter individually or concurrently calculates vertical and horizontal Haar features for the plurality of pixels comprising masked imaged 221 and may further calculate a Haar response by summing the vertical and horizontal Haar features. The edge detection module 230 may further filter pixels from the plurality of pixels comprising masked image 221 based on whether the calculated Haar response meets or exceeds a predetermined threshold to generate filtered image 231.

Filtered image 231 is received by feature vector generation module 240 which is configured to generate one or more feature vectors 241 for the plurality of pixels comprising filtered image 231. The feature vectors 241 are then received by the classification module 250. Classification module 250 comprises a machine learning algorithm trained to predict whether a given feature vector, for example feature vector 241, is indicative of the presence of an overlay in the image. Classification module 250 may include any machine learning algorithm known in the art (ex. neural networks, Naïve Bayes, Random Forest, decision trees, support vector, etc.). Classification module 250, however, preferably comprises a relevance vector machine learning algorithm or a binary classifier.

Pixel management module 260 receives a prediction from classification module 250. When the classification module 250 predicts or otherwise classifies a feature vector as corresponding to pixels indicative of the presence of an overlay, the pixel management module 260 initiates a redaction process. The redaction process may remove, replace, obfuscate, or otherwise make unreadable to human or machine the pixels associated with the predicted overlay. Further, the process of applying masks, filtering edges, generating feature vectors, and leveraging binary classifiers reduces the processing required to identify overlays such that system 200 processes images at a rate of at least 30 frames per second (fps). Accordingly, system 200 may operate in real-time and pixel management module 260 may prevent the inclusion of overlays rather than redacting pixels associated with overlays after-the-fact.

The term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 3:
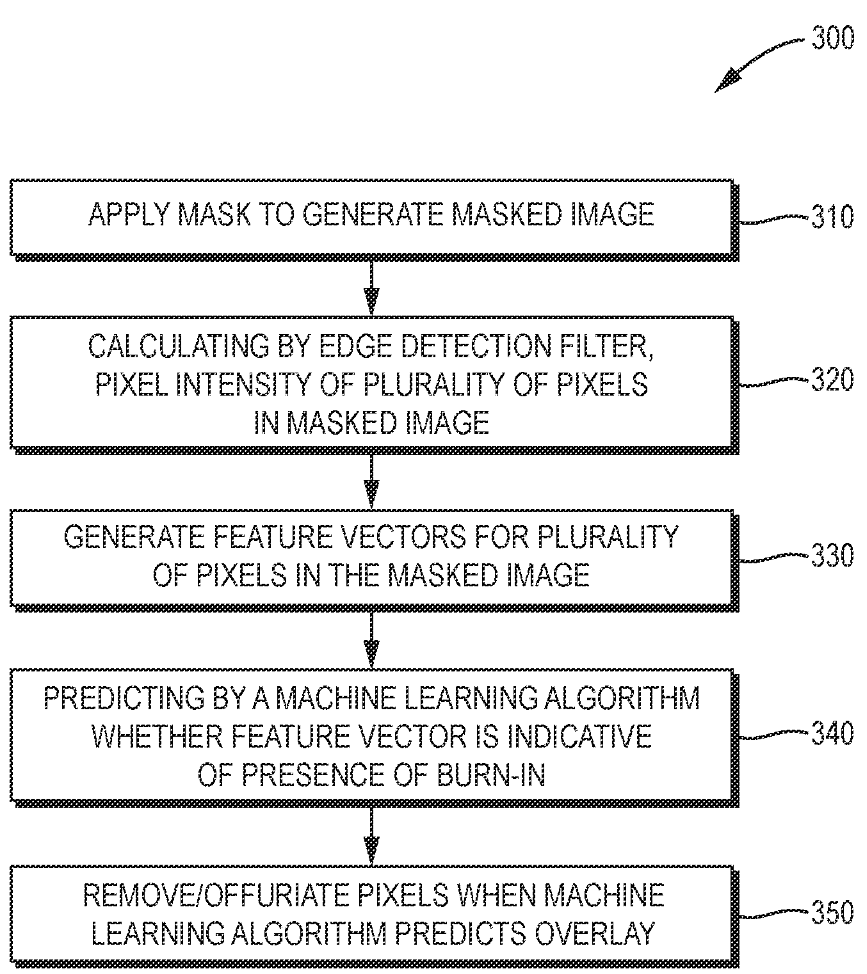
FIG. 3 provides a method for automatic removal of burn-in overlay data.

FIG. 3 provides a method 300 according to one or more examples, with reference to components and features described herein including but not limited to the figures and associated description. In one or more examples, the method 300 is implemented in one or more modules as a set of logic instructions stored in at least one non-transitory machine readable or computer readable storage medium such as, but not limited to, random access memory (RAM), read-only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuits (ASICs), complementary metal oxide semiconductors (CMOS), Video Random Access Memory (VRAM), Graphics Processing Units, or transistor-transistor logic (TTL) technology, or any combination thereof. Those of ordinary skill in the art will recognize that this list is non-exhaustive and further includes yet-to-be developed logic processing devices capable of executing logical instructions.

The method 300 automatically identifies, classifies, and redacts overlays in video images. The "redaction" of overlays, as used herein, includes but is not limited to deleting pixels, blurring pixels, obfuscating pixels, replacing pixels (ex. text which is "blacked-out"), or otherwise making pixels unreadable by humans or machines. The process begins at block 310 where a mask is applied to an image to generate a masked image. In examples, the masked image may be generated by applying a color filter, image decomposition filter, thresholding filter, edge detection filter, clustering filter, graph based filter, machine learning algorithm, or any combination thereof.

At block 320, the pixel intensity of a plurality of pixels in the masked imaged generated at block 310 is calculated by an edge detection filter. The edge detection filter/algorithm identifies the edges and/or boundaries within the masked image generated at block 310 and calculates the pixel intensities for a plurality of pixels comprising the masked image generated at block 310. The edge detection filter/algorithm may be any known edge detection algorithms including, but not limited to, those described with reference to the system depicted in FIG. 2. In one or more examples of the method 300, the edge detection filter is a Haar filter. When method 300 implements or otherwise leverages a Haar filter, the Haar filter may individually or concurrently calculate the vertical and horizontal Haar features for the plurality of pixels comprising the masked imaged generated at block 310 and may further calculate a Haar response by summing the vertical and horizontal Haar features. Block 320 may further filter pixels from the plurality of pixels comprising the masked image generated at block 310 based on whether the calculated Haar response meets or exceeds a predetermined threshold. Block 320 provides a masked image and pixel intensities for the pixels within the masked image.

At block 330, a feature vector is generated for the plurality of pixels in the masked image generated at block 320.

At block 340, a machine learning algorithm is applied to the feature vectors generated at block 330. The machine learning algorithm may be trained to predict whether a given feature vector is indicative of the presence of an overlay in the image. The machine learning algorithm may include any machine learning algorithm known in the art including, but not limited to, those described with reference to the system depicted in FIG. 2. However, the machine learning algorithm preferably comprises a relevance vector machine learning algorithm or a binary classifier. At block 330, the machine learning algorithm provides a prediction or classification for a given feature vector. This may include a prediction or classification as to whether a given feature vector is indicative of the presence of an overlay in an image.

At block 350, the prediction or classification of block 340 is leveraged such that when a feature vector is predicted to be associated with pixels having an overlay, the pixels are removed, redacted, blurred, obfuscated, or otherwise made unreadable by human or machine.

Figure 4:
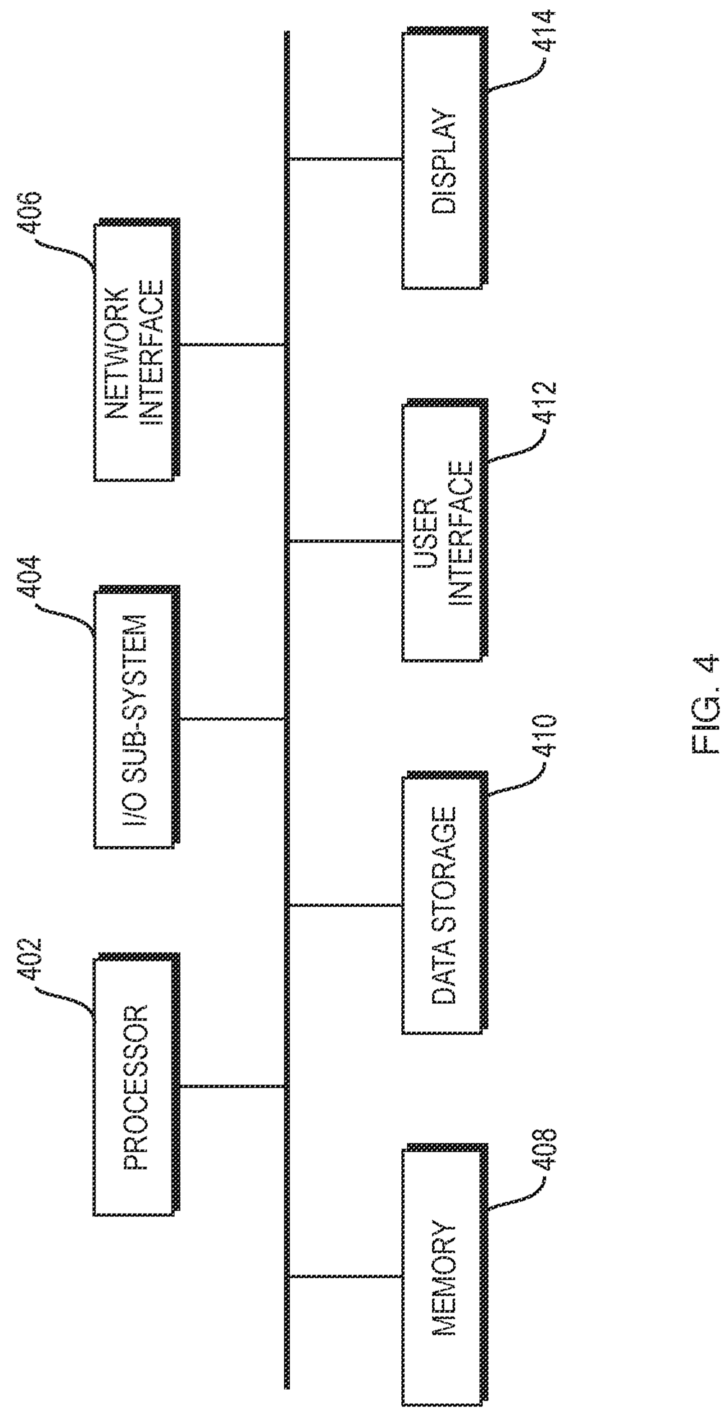
FIG. 4 provides a computing system for removing burn-in overlay data.

As previously described, the method 300 may be implemented as a set of instruction stored in at least one non-transitory computer readable medium. FIG. 4 is a diagram illustrating a computing system 400 implementing such a set of instructions. Although FIG. 4 illustrates certain components, the computing system 400 can include additional or multiple components connected in various ways. It is understood that not all examples will necessarily include every component shown in FIG. 4. As illustrated in FIG. 4, the computing system 400 includes one or more processors 402, an I/O subsystem 404, a network interface 406, a memory 408, data storage 410, user interface 412, and/or a display 414.

The processor 402 can include one or more processing devices such as a microprocessor, a central processing unit (CPU), a fixed application-specific integrated circuit (ASIC) processor, a reduced instruction set computing (RISC) processor, a complex instruction set computing processor (CISC), a field programmable gate array (FPGA), etc., along with associated circuitry, logic, and/or interfaces. The processor 402 can include, or be connected to, a memory (ex. memory 408) storing executable instruction and/or data, as necessary or appropriate. The processor 402 can execute such instructions to implement control, operate, or interface with any component or features of the system 200, and/or any of the components or methods described herein with reference to FIGS. 1-3. The processor can communicate, send, or receive messages, requests, notifications, data, etc. to/from other devices. The processor 402 can be embodied as any type of processor capable of performing the functions described herein. For example, the processor 402 can be embodied as a single or multi-core processor(s), a digital signal processor, a microcontroller, or other processor or processing/controlling circuit.

The I/O subsystem 404 includes circuitry and/or components suitable to facilitate input/output operations with the processor 402, the memory 408, and other components of the computing system 400.

The network interface 406 includes suitable logic, circuitry, and/or interfaces that transmits and receives data over one or more communication networks using one or more communication network protocols. The network interface 406 can operate under the control of processor 402, and can transmit/receive various requests and messages to/from one or more devices. The network interface 406 can include wired or wireless data communication capability which support data communication with a wired or wireless communication network. The network interface 406 can support communication via a short-range wireless communication field (ex. Bluetooth, ZigBee, NFC). Examples of network interface 406 include, but are not limited to, one or more antenna, a radio frequency transceiver, a wireless transceiver, a Bluetooth transceiver, an Ethernet port, a universal serial bus (USB) port, or any other device configured to transmit and receive data.

The memory 408 includes suitable logic, circuitry, and/or interfaces to store executable instructions and/or data, as necessary or appropriate, when executed, to implement, control, operate or interface with any components or features of the system 200, and/or any of the components or methods described herein with reference to FIGS. 1-4. The memory 408 can be embodied as any type of volatile or non-volatile memory or data storage capable of performing the functions described herein, and can include random-access memory (RAM), read-only memory (ROM), write-once read-multiple memory (e.g., EEPROM), a removable storage device, a hard disk drive, a flash memory, a solid-state memory, and the like, and including any combination thereof. In operation, the memory 408 can store various data and software used during operation of the computing system 400 such as operating systems, applications, programs, libraries, and drivers. Thus, the memory 408 can include at least one non-transitory computer readable medium comprising instructions which, when executed by the computing system 400, cause the computing system 400, the system 200, and/or any of the components or methods described herein. The memory 408 can be communicatively coupled to the processor 402 directly or via the I/O subsystem 404.

The data storage 410 can include any type of device or devices configured for short-term or ling-term storage of data such as, for example, memory devices and circuits, memory cards, hard disk drives, solid state drives, nonvolatile flash memory, or other data storage devices. The data storage 410 can include or be configured as a database, such as a relational or non-relational data base, or a combination of more than one database. In some examples, a database or other data storage can be physically separate and/or remote from the computing system 400, and/or can be located in another computing device, a database server, on a cloud-based platform, or in any storage device that is in data communication with computing system 400.

When the process of automatically determining the presence of an overlay is implemented as a set of instructions in non-transitory computer readable medium, the instructions are stored in memory 408. Processor 402 may directly communicate with memory 408 or may, alternatively, communicate with memory 408 via I/O subsystem 404. The instructions on memory 408, when executed by processor 402, cause a computing system 400 to perform operations comprising applying a mask to an image to generate a masked image. The image may be made available to the processor by memory 408, data storage 410, network interface 406, via the I/O subsystem 404, or any combination thereof. In examples, the masked image may be generated by applying a color filter, image decomposition filter, thresholding filter, edge detection filter, clustering filter, graph based filter, machine learning algorithm, or any combination thereof. Thereafter the processor 402 calculates the pixel intensities of a plurality of pixels in the masked imaged by an edge detection filter. The edge detection filter/algorithm identifies the edges and/or boundaries within the masked image and calculates the pixel intensities for a plurality of pixels comprising the masked image. The edge detection filter/algorithm may be any known edge detection algorithms including, but not limited to, those described with reference to the system depicted in FIG. 2. This edge detection filter/algorithm may be a Haar filter. When a Haar filter is applied, the Haar filter may individually or concurrently calculate the vertical and horizontal Haar features for the plurality of pixels comprising the masked image and may further calculate a Haar response by summing the vertical and horizontal Haar features. The instruction stored on the non-transitory computer readable medium may further cause processor 402 to perform the steps of generating a feature vector for the plurality of pixels filtered by the edge detection filter. This filtering process may be based on whether the calculated Haar response meets or exceeds a predetermined threshold. The instructions further cause the processor 402 to apply a machine learning algorithm to the generated feature vectors. As discussed with reference System 200 and Method 300, the machine learning algorithm may be trained to predict whether a given feature vector is indicative of the presence of an overlay in the image. The machine learning algorithm may include any machine learning algorithm known in the art including, but not limited to, those described with reference to the system depicted in FIG. 2. However, the machine learning algorithm preferably comprises a relevance vector machine learning algorithm or a binary classifier. The instruction cause the processor 402 to utilize the machine learning algorithm to provide a prediction or classification for a given feature vector. This may include a prediction or classification as to whether a given feature vector is indicative of the presence of an overlay in an image. When the machine learning algorithm predicts that a given feature vector is indicative of the presence of an overlay, the instruction cause the processor 402 to remove, redact, blur, obfuscate or otherwise render unreadable the pixels associated with the feature vector. The instructions may further cause the processor 402 to perform the aforementioned steps at a rate of at least 30 fps (i.e. in real-time). When the instructions are performed at a rate of 30 fps, the computing system may prevent the inclusion of overlays rather than redacting the overlays. The instructions may further cause the processor to display the image with redacted overlays on display 414, user interface 412, or any combination thereof.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductor), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A computing system for identifying the presence of burn-in in video, the computing system comprising:

a processor; and a memory coupled to the processor, the memory storing instructions which, when executed by the processor, cause the computing system to perform operations comprising:

receiving an image;

applying a masking filter to the image to generate a masked image;

calculating, by an edge detection filter applied to the masked image, the presence of a plurality of vertical and horizontal features in the masked image for a plurality of pixels in the masked image;

generating a feature vector for the plurality of pixels in the masked image; wherein the feature vector is indicative of the presence and position of vertical and horizontal features;

predicting, by a machine learning algorithm, whether the feature vector is indicative of the presence of a burn-in; and initiating a redaction process to redact pixels corresponding to the feature vector when the machine learning algorithm predicts that the feature vector is indicative of the presence of burn-in.

2. The computing system of claim 1, wherein the edge detection filter is a Haar filter.

3. The computing system of claim 1, wherein the machine learning algorithm is a Bayesian machine learning algorithm.

4. The computing system of claim 3, wherein the Bayesian machine learning algorithm is a Relevance Vector Machine.

5. The computing system of claim 1, wherein the machine learning algorithm is a binary classifier.

6. The computing system of claim 1, wherein the images are received at a rate of at least 30 images per second or less.

7. The computing system of claim 1, wherein the redaction process further comprises the operation of replacing pixels corresponding to the mask in the image that has been predicted to include burn-in.

8. The computing system of claim 2, wherein the Haar filter performs the operations of:

calculating vertical and horizontal Haar features for the plurality of pixels in the masked image by computing vertical and horizontal Haar integral kernel responses on the integral image of the mask; calculating a summed Haar filter response by summing the vertical and horizontal Haar features;

thresholding pixels from the plurality of pixels based on whether the summed Haar response exceeds a predetermined threshold and resizing and reshaping the result of the thresholding into a feature vector.

9. At least one non-transitory computer readable medium comprising instructions which, when executed by a computing system, cause the computing system to perform operations comprising:

applying a filter to an image to generate a masked image;

calculating, by an edge detection filter applied to the masked image, the presence of a plurality of vertical and horizontal features in the masked image for the plurality of pixels in the masked image;

generating a feature vector for the plurality of pixels in the masked image; that describes the presence and position of vertical and horizontal features;

predicting, by a machine learning algorithm, whether the feature vector is indicative of the presence of a burn-in; and performing a redaction process to redact pixels corresponding to the feature vector when the machine learning algorithm predicts that the feature vector is indicative of the presence of burn-in.

10. The at least one non-transitory computer readable medium of claim 9, wherein the edge detection filter applied to the masked edge is a Haar filter.

11. The at least one non-transitory computer readable medium of claim 9, wherein the machine learning algorithm is a Bayesian machine learning algorithm.

12. The at least one non-transitory computer readable medium of claim 11, wherein the Bayesian machine learning algorithm is a Relevance Vector Machine.

13. The at least one non-transitory computer readable medium of claim 9, wherein the machine learning algorithm is a binary classifier.

14. The at least one non-transitory computer readable medium of claim 9, wherein the redaction process further comprises replacing pixels corresponding to the mask in the image indicating the presence of burn-in.

15. The at least one non-transitory computer readable medium of claim 10, wherein the Haar filter calculates vertical and horizontal Haar features for the plurality of pixels in the masked image by computing vertical and horizontal Haar integral kernel responses on the integral image of the mask;

calculates a summed Haar filter response by summing the vertical and horizontal Haar features; and thresholds pixels from the plurality of pixels based on whether the summed Haar response exceeds a predetermined threshold and resizes and reshapes the result of the thresholding into a feature vector.

16. A method comprising:

applying a filter to an image to generate a masked image;

calculating, by an edge detection filter applied to the masked image, the presence of a plurality of vertical and horizontal features in the masked image for the plurality of pixels in the masked image;

generating a feature vector for the plurality of pixels in the masked image that describes the presence and position of vertical and horizontal features; predicting, by a machine learning algorithm, whether the feature vector is indicative of the presence of a burn-in; and initiating a redaction process to redact pixels corresponding to the feature vector when the machine learning algorithm predicts that the feature vector is indicative of the presence of burn-in.

17. The method of claim 16 wherein the edge detection filter is a Haar filter.

18. The method of claim 16 wherein the machine learning algorithm is a Bayesian machine learning algorithm.

19. The method of claim 18 wherein the machine learning algorithm is one of i) a Relevance Vector Machine; or ii) a binary classifier.

20. The method of claim 16 wherein the edge detection filter is a Haar filter and wherein the Haar filter calculates vertical and horizontal Haar features for the plurality of pixels in the masked image by computing vertical and horizontal Haar integral kernel responses on the integral image of the mask;

calculates a summed Haar response by summing the vertical and horizontal Haar features; and thresholds pixels from the plurality of pixels based on whether the summed Haar response exceeds a predetermined threshold and resizes and reshapes the result of the thresholding into a feature vector.

* * * * *